United States Patent
Lin et al.

(10) Patent No.: US 10,503,544 B2
(45) Date of Patent: Dec. 10, 2019

(54) EFFICIENT MAPPING FROM TASK GRAPHS TO DYNAMIC SYSTEM PLATFORMS

(71) Applicant: TOYOTA JIDOSHA KABUSHIKI KAISHA, Toyota-shi, Aichi-ken (JP)

(72) Inventors: Chung-Wei Lin, Sunnyvale, CA (US); BaekGyu Kim, Cupertino, CA (US); Shinichi Shiraishi, San Jose, CA (US)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 120 days.

(21) Appl. No.: 15/296,016

(22) Filed: Oct. 17, 2016

(65) Prior Publication Data
US 2018/0107507 A1    Apr. 19, 2018

(51) Int. Cl.
*G06F 9/46* (2006.01)
*G06F 9/48* (2006.01)
*G06F 9/50* (2006.01)

(52) U.S. Cl.
CPC ......... *G06F 9/4881* (2013.01); *G06F 9/5066* (2013.01)

(58) Field of Classification Search
CPC .................. G06F 9/4831; G06F 9/4881
See application file for complete search history.

(56) References Cited

U.S. PATENT DOCUMENTS

| | | | | |
|---|---|---|---|---|
| 8,121,996 B2* | 2/2012 | Andreev | ............ | G06F 8/24 700/28 |
| 8,543,438 B1* | 9/2013 | Fleiss | ............ | G06Q 10/0631 705/7.11 |
| 2004/0194095 A1* | 9/2004 | Lumb | ............ | G06F 9/4887 718/100 |
| 2012/0134449 A1* | 5/2012 | Chen | ............ | H04L 1/0052 375/340 |
| 2018/0024837 A1* | 1/2018 | Sadowski | ............ | G06F 9/30145 |

OTHER PUBLICATIONS

Bate et al., "Incorporating Scenarios and Heuristics to Improve Flexibility in Real-Time Embedded Systems," Real-Time and Embedded Technology and Applications Symposium, 2006. Proceedings of the 12th IEEE, Apr. 4, 2006 (10 pages).
Metzner et al., "RTSAT—An Optimal and Efficient Approach to the Task Allocation Problem in Distributed Architectures," Real-Time Systems Symposium, 27th IEEE International, Dec. 5, 2006 (10 pages).

(Continued)

*Primary Examiner* — Camquy Truong
(74) *Attorney, Agent, or Firm* — Patent Law Works LLP

(57) ABSTRACT

In an example embodiment, a computer-implemented method is disclosed that computes, using one or more processors, a path slack value for each path of a set of paths of a functional computing model. Each path of the set of paths comprises a set of tasks and the path slack value of each path reflects a difference between a deadline and a latency of the path. The method further determines a priority of each task of the set of tasks of each path based on the path slack value of the path, and allocates, using the one or more processors and based on the priority of each task, the tasks of each of the paths of the set to corresponding computing units from a set of computing units of an architectural platform.

25 Claims, 15 Drawing Sheets

(56) References Cited

OTHER PUBLICATIONS

Zheng et al., "Definition of Task Allocation and Priority Assignment in Hard Real-Time Distributed Systems," 28th IEEE International Real-Time Systems Symposium, Dec. 3, 2007 (10 pages).
Zhu et al., "Optimizing the Software Architecture for Extensibility in Hard Real-Time Distributed Systems," IEEE Transactions on Industrial Informatics, Nov. 6, 2010 (16 pages).
Lin et al., "Security-Aware Mapping for Can-Based Real-Time Distributed Automotive Systems," Proceedings of the International Conference on Computer-Aided Design, IEEE, Nov. 18, 2013 (7 pages).

\* cited by examiner

| | | Function Model | | Architectural Platform |
|---|---|---|---|---|
| Element | $\tau_i$ | the $i$-th task | $\varepsilon_i$ | the $i$-th ECU |
| | $\sigma_i$ | the $i$-th signal | $\mu_i$ | the $i$-th message |
| | $\pi, \pi_i$ | a path/application, the $i$-th path/application | | |
| Set | $\mathcal{T}$ | the set of tasks | $\mathcal{E}$ | the set of ECUs |
| | $\mathcal{S}$ | the set of signals | $\mathcal{M}$ | the set of messages |
| | $\mathcal{P}$ | the set of paths/applications | | |
| Constant Parameter | $T_{\tau_i}$ | the activation period of $\tau_i$ | $T_{\mu_i}$ | the activation period of $\mu_i$ |
| | $C_{\tau_i}$ | the execution time of $\tau_i$ | $C_{\mu_i}$ | the transmission time of $\mu_i$ |
| | $T_{\sigma_i}$ | the activation period of $\sigma_i$ | $L$ | the length of a message header |
| | $L_{\sigma_i}$ | the data length of $\sigma_i$ | $B$ | the network bandwidth |
| | $D_{\pi_i}$ | the deadline of $\pi_i$ | | |
| Decision Variable | $a_i$ | the allocation of $\tau_i$ | $q_i$ | the priority of $\mu_i$ |
| | $p_i$ | the priority of $\tau_i$ | | |
| Dependent Variable | $r_{\tau_i}$ | the worst-case response time of $\tau_i$ | $r_{\mu_i}$ | the worst-case response time of $\mu_i$ |
| | $r_{\sigma_i}$ | the worst-case response time of $\sigma_i$ | | |
| | $l_{\pi_i}$ | the worst-case latency of $\pi_i$ | | |

---
ALGORITHM 3: Driving-Time Activation Algo.
---
1: for $l = 1$ to $n/2$ do
2:   Select a non-allocated pair $(\tau_{i_{2j-1}}, \tau_{i_{2j}})$ with the smallest $M_j$;
3:   Select a non-used ECU $\varepsilon_k$ with the smallest $N_k$ and $f_2(\tau_{i_{2j-1}}, \tau_{i_{2j}}, \varepsilon_k) = 1$;
4:   $a_{i_{2j-1}} = a_{i_{2j}} = k$;
5:   $p^* =$ the lowest priority of allocated tasks on $\varepsilon_k$;
6:   if $r_2^H(\tau_{i_{2j-1}}, \tau_{i_{2j}}, \varepsilon_k) + r_2^L(\tau_{i_{2j-1}}, \tau_{i_{2j}}, \varepsilon_k) \leq r_2^H(\tau_{i_{2j}}, \tau_{i_{2j-1}}, \varepsilon_k) + r_2^L(\tau_{i_{2j}}, \tau_{i_{2j-1}}, \varepsilon_k)$ then
7:      $p_{i_{2j-1}} = p^* + 1$;
8:      $p_{i_{2j}} = p^* + 2$;
9:   else
10:     $p_{i_{2j-1}} = p^* + 2$;
11:     $p_{i_{2j}} = p^* + 1$;
12:  end if
13:  Mark $(\tau_{i_{2j-1}}, \tau_{i_{2j}})$ as an allocated pair;
14:  Mark $\varepsilon_k$ as an used ECU;
15:  Update $M_j$ for each non-allocated pair;
16:  Update $N_k$ for each non-used ECU;
17: end for
18: Assign message priority by the rate-monotonic policy;
19: Check feasibility;
20: Output solution or warning message (if not feasible);

|  | $\mathcal{P}_=$ | $\mathcal{P}_{\neq}$ | $\mathcal{P}_+$ | $\mathcal{P}_\times$ |
|---|---|---|---|---|
| Traditional Setting | $= \emptyset$ | $= \emptyset$ | $= \mathcal{P}$ | $= \emptyset$ |
| Plug-and-Play Setting 1 | $= \emptyset$ | $= \emptyset$ | $\subseteq \mathcal{P}$ | $\subseteq \mathcal{P}$ |
| Plug-and-Play Setting 2 | $\subseteq \mathcal{P}$ | $= \emptyset$ | $\subseteq \mathcal{P}$ | $\subseteq \mathcal{P}$ |
| Plug-and-Play Setting 3 | $\subseteq \mathcal{P}$ | $\subseteq \mathcal{P}$ | $\subseteq \mathcal{P}$ | $\subseteq \mathcal{P}$ |
| Plug-and-Play Setting 4 | $\subseteq \mathcal{P}$ | $\subseteq \mathcal{P}$ | $= \emptyset$ | $\subseteq \mathcal{P}$ |

Figure 13

1400 

| ALGORITHM 1: Main Algorithm |
|---|
| 1: $p^* = 0$; |
| 2: for $j = 1$ to $|\mathcal{T}_\mp \cup \mathcal{T}_+|$ do |
| 3:     Compute slacks of paths and non-allocated tasks; |
| 4:     Sort non-allocated tasks by ascending slack; |
| 5:     $\tau_i$ = the first non-allocated task; |
| 6:     $p_i = p^*$; |
| 7:     $p^* = p^* + 1$; |
| 8:     for each ECU $\varepsilon_k$ do |
| 9:        $a_i = k$; |
| 10:        Compute $r_{\tau_i}$ and related slacks; |
| 11:        if no constraint is violated then |
| 12:           $\Delta_k$ = summation of all path slacks; |
| 13:        else |
| 14:           $\Delta_k = -\infty$; |
| 15:        end if |
| 16:     end for |
| 17:     $a_i = \arg\max_k \Delta_k$; |
| 18:     Compute $r_{\tau_i}$; |
| 19: end for |
| 20: $q^* = 0$; |
| 21: for $j = 1$ to number of external signals in $\mathcal{S}_\mp \cup \mathcal{S}_+$ do |
| 22:     Compute slacks of paths and non-prioritized signals; |
| 23:     Sort non-prioritized signals by ascending slack; |
| 24:     $\sigma_i$ = the first non-allocated signal; |
| 25:     $q_i = q^*$; |
| 26:     $q^* = q^* + 1$; |
| 27:     Compute $r_{\sigma_i}$; |
| 28: end for |
| 29: Output solution or warning message (if not feasible); |

---
ALGORITHM 2: Post-Processing Algorithm
---
1: for each $\sigma_i$ in $\mathcal{S}_\times$ do
2:   Compute and store $r_0(\sigma_i)$ and $f_0(\sigma_i)$;
3: end for
4: for each $(\tau_i, \varepsilon_k) \in \mathcal{T}_\times \times \mathcal{E}$ do
5:   Compute and store $r_1(\tau_i, \varepsilon_k)$ and $f_1(\tau_i, \varepsilon_k)$;
6: end for
7: for each $(\tau_i, \tau_j, \varepsilon_k) \in \mathcal{T}_\times \times \mathcal{T}_\times \times \mathcal{E}$ where $i \neq j$ do
8:   Compute and store $r_2^H(\tau_i, \tau_j, \varepsilon_k)$, $r_2^L(\tau_i, \tau_j, \varepsilon_k)$, and $f_2(\tau_i, \tau_j, \varepsilon_k)$;
9: end for
---

EFFICIENT MAPPING FROM TASK GRAPHS TO DYNAMIC SYSTEM PLATFORMS

BACKGROUND

The present disclosure relates to task mapping in dynamic systems.

Software plays a more and more crucial role in automotive systems in recent years. For instance, it is increasingly used to define automotive systems such as Advanced Driver Assistance Systems (ADAS), such as adaptive cruise control, lane keeping assist, and autonomous functions that provide the platform for software to define automotive systems. Compared with hardware components, software applications can, in some cases, be easier to install, update, and activate, leading to the realization of flexible plug-and-play automotive systems that can improve system safety and performance, enhance user experience, and make appropriate adaptions to obey traffic regulations.

However, traditional design methods, which statically map functional models to architectural platforms, such as ones proposed by Bate et al., Incorporating Scenarios and Heuristics to Improve Flexibility in Real-Time Embedded Systems, IEEE Real-Time and Embedded Technology and Applications Symposium (RTAS), pages 221-230, April 2006 ("Bate"); Lin et al., Security-Aware Mapping for CAN-Based Real-Time Distributed Automotive Systems, IEEE/ACM International Conference on Computer-Aided Design (ICCAD), pages 115-121, November 2013 ("Lin"); Metzner et al., RTSAT—An Optimal and Efficient Approach to the Task Allocation Problem in Distributed Architectures, IEEE International Real-Time Systems Symposium (RTSS), pages 147-158, December 2006 ("Metzner"); Zheng et al., Definition of Task Allocation and Priority Assignment in Hard Real-Time Distributed Systems, IEEE International Real-Time Systems Symposium (RTSS), pages 161-170, December 2007 ("Zheng"); and Zhu et al., Optimizing the Software Architecture for Extensibility in Hard Real-Time Distributed Systems, IEEE Transactions on Industrial Informatics, 6(4):621-636, November 2010 ("Zhu"), are incompatible with provide plug-and-play automotive systems, particularly in plug-and-play scenarios like installation, updating, and activation of software applications prior to purchase (e.g., at a dealership), before driving, and during driving.

For instance, traditional design methods, such as those described by Bate, Lin, Metzner, Zheng, and Zhu, which may involve mathematical programming, iteration-based optimization (e.g., simulated annealing), various searching efforts, are configured to solve mapping problems only during design stages and not during operation of the vehicle. The lengthy and computationally expensive runtimes of the mapping algorithms of these methods, for which there are typically no hard timing constraints, are designed for powerful computing units made available (e.g., in a laboratory) for solving the problems. The runtimes of these methods are not suitable for automobiles whose ECUs lack the capability needed to execute them while executing other critical driving operations (e.g., frequencies of most practical ECUs are often less than 100 MHz). In a plug-and-play scenario, efficient mapping algorithms are needed because the mapping results must be generated in real-time (without discernable lag) or serious consequences, even life-threatening, can result.

Further, the traditional design methods are generally not designed for incremental changes to certain applications while preserving other applications, but rather to change underlying systems as whole.

SUMMARY

The subject matter described in this disclosure overcomes the deficiencies and limitations of the methods described in the Background at least in part by providing novel technology for efficient mapping from task graphs to dynamic system platforms.

According to one innovative aspect of the subject matter described in this disclosure, a system includes a set of computing units and one or more memories storing instructions that, when executed by the system, cause the system to perform operations. These operation include computing a path slack value for each path of a set of paths of a functional computing model; that each path of the set of paths comprises a set of tasks, the path slack value of each path reflects a difference between a deadline and a latency of the path; determining a priority of each task of the set of tasks of each path based on the path slack value of the path; and allocating, based on the priority of each task, the tasks of each of the paths of the set to corresponding computing units from a set of computing units of an architectural platform.

In general, another innovative aspect of the subject matter described in this disclosure may be embodied in methods that include computing a path slack value for each path of a set of paths of a functional computing model, each path of the set of paths comprising a set of tasks, the path slack value of each path reflecting a difference between a deadline and a latency of the path; determining a priority of each task of the set of tasks of each path based on the path slack value of the path; and allocating, based on the priority of each task, the tasks of each of the paths of the set to corresponding computing units from a set of computing units of an architectural platform.

Other aspects include corresponding methods, systems, apparatus, and computer program products for these and other innovative aspects.

These and other implementations may each optionally include one or more of the following features and/or operations. For instance, the features and/or operations include: computing a response time for a first task from the tasks of a first path of the set of paths; that the first task has a priority higher than priorities of other non-allocated tasks of the path; that allocating, based on the priority of each task, the tasks of the paths to corresponding computing units includes, for each computing unit of the set of computing units of the architectural platform, determining a computing unit from the set of computing units to which to assign the first task based on the path slack value of one or more of the paths of the set; that the path slack value is further computed based on the response time; that determining the computing unit from the set of computing units is based on a largest summation of path slack values associated with the paths of the set; computing response times for the tasks of each path of the set of paths; storing the response times in one or more lookup tables; during drive time, activating an application associated with the set of paths using the response times stored in the one or more lookup tables; that the tasks of the paths are allocated in order of descending priorities; that computing the path slack value for each path includes determining a deadline value associated with the path, determining a latency associated with the tasks of the path, and computing a difference between the deadline value and the latency; that determining the latency associated with the tasks of the path includes calculating a worst-case response time associated with the tasks of the path, calculating an activation period associated with the tasks of the path, calculating a worst-case response time associated with signals of the path, calculating an activation period associated with the signals of the path, and calculating the latency based on the worst-case response time associated with the tasks of the path; that the activation period associated with the tasks of the path, the worst-case response time associated with the signals of the path, and the activation period associated with the signals of the path; that the deadline value is set to an activation period; that the path slack value of a path from the set of paths is determined based on an activation period of a task included in the path; determining a response time of the task included in the path; recomputing the slack value for the path that includes the task based on the response time; and that allocating, based on the priority of each task, the tasks includes selecting a pair of tasks based on a number of computing units needed to process the pair of tasks, selecting a corresponding computing unit based on an impact to other remaining pairs of tasks requiring processing, and processing the pair of tasks using the corresponding computing unit.

The novel technology presented in this disclosure is particularly advantageous in a number of respects. For example, the technology described herein provides an efficient mapping solution for plug-and-play automotive systems in various plug-and-play scenarios; can map a task graph to a distributed platform; can address real-time constraints; does not necessitate mathematical programming or iteration-based optimization (e.g., simulated annealing); are adapted for incremental changes; can determine the feasibility of applications which have been mapped without remapping entirely so that new applications can be mapped directly and efficiently; and is efficient in numerous different scenarios. By way of example, assuming practical ECU frequency, the technology can achieve suitable runtimes in various different scenarios, such as 8 seconds application activation at a dealership and before driving, and 0.01 seconds for driving-time application activation.

Further, the technology can provide the flexibility to deploy new applications and support fault recovery when applications need to be relocated to other ECUs. As a non-limiting example, using lookup tables from single-task setting to task-pair setting, the technology can improve the activation rate of a new application from 2.3% to 78.9% with acceptable computation and space overheads.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

FIG. 11 illustrates a table listing example notations of elements, sets, constant parameters, decision variables, and dependent variables.

FIGS. 12, 14, and 15 illustrate example algorithms.

FIG. 13 illustrates a table listing example settings.

DESCRIPTION

The technology described herein can efficiently map tasks for processing in a variety of different plug-and-play scenarios. For instance, the technology includes methods and corresponding systems that can map a task graph to a platform, such as a distributed platform, address real-time constraints, and deal with the challenges of dynamic plug-and-play systems, such as automotive and other vehicular systems, although other dynamic systems requiring real-time processing are also possible and contemplated.

Figure 1:
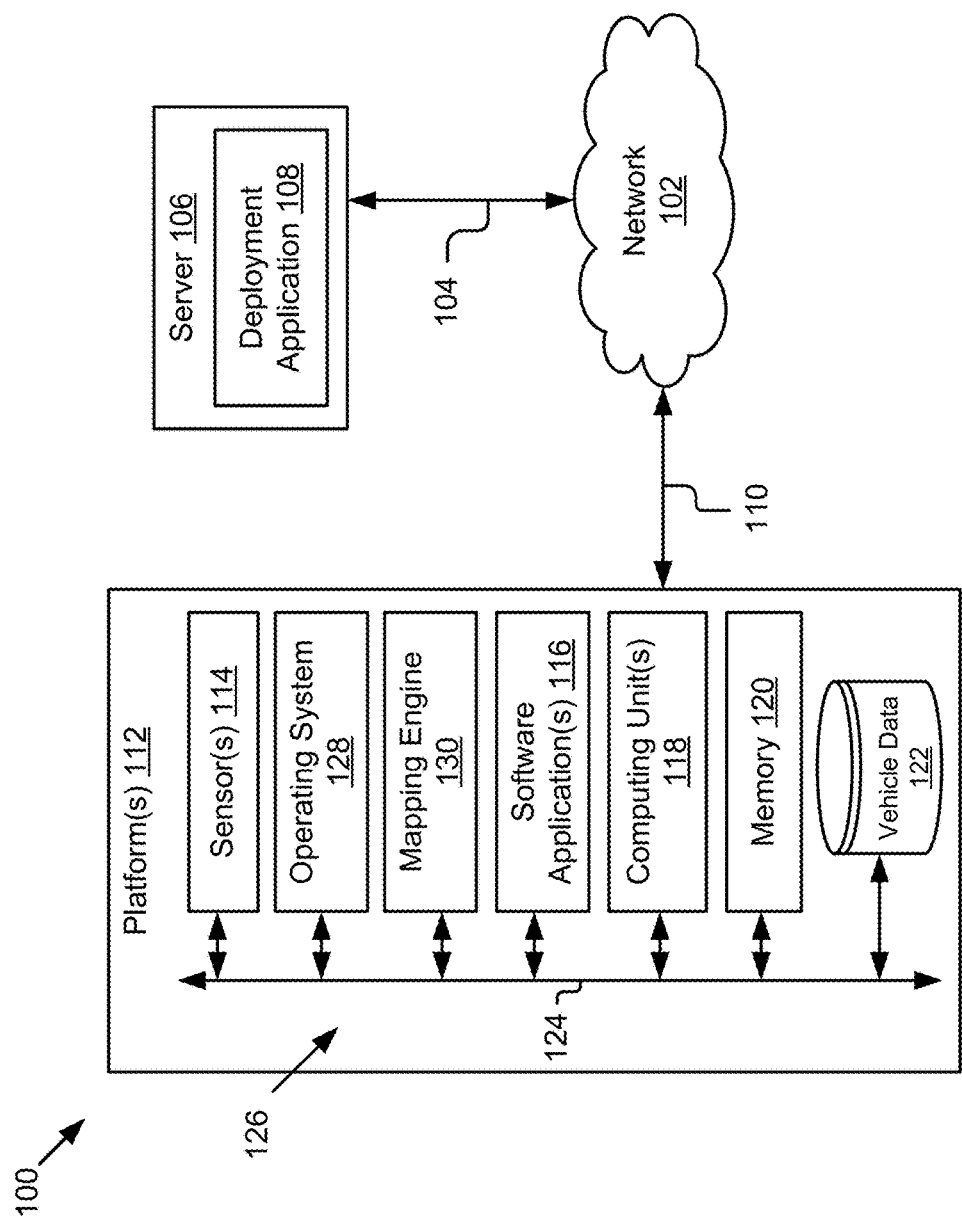
FIG. 1 is a block diagram of an example system for efficiently mapping tasks for execution.

FIG. 1 is a block diagram of one such example system 100 for efficiently mapping tasks for execution. As shown, the system 100 includes a server 106 and one or more platforms 112 coupled for electronic communication via a network 102.

The network 102 may be a conventional type, wired and/or wireless, and may have numerous different configurations including a star configuration, token ring configuration, or other configurations. For instance, the network 102 may include one or more local area networks (LAN), wide area networks (WAN) (e.g., the Internet), public networks, private networks, virtual networks, peer-to-peer networks, and/or other interconnected data paths across which multiple devices may communicate.

The network 102 may also be coupled to or include portions of a telecommunications network for sending data in a variety of different communication protocols. In some embodiments, the network 102 includes Bluetooth® communication networks or a cellular communications network for sending and receiving data including via short messaging service (SMS), multimedia messaging service (MMS), hypertext transfer protocol (HTTP), direct data connection, WAP, email, etc. In some embodiments, the network 102 is a wireless network using a connection such as DSRC, WAVE, 802.11p, a 3G, 4G, 5G+ network, WiFi™, or any other wireless networks. Although FIG. 1 illustrates a single block for the network 102 that couples the server 106 and the platform(s) 112, it should be understood that the network 102 may in practice comprise any number of combination of networks, as noted above.

The server 106 may include a hardware and/or virtual server that includes processor(s), memory(ies), and network communication capabilities (e.g., communication unit(s)). The server 106 may be communicatively coupled to the network 102, as reflected by signal line 104. In some embodiments, the server 106 may send and receive data to and from one or more platform(s) 112. In some embodiments, the server 106 may include a deployment application 108, as discussed further elsewhere herein.

The platform(s) 112 include computing devices 126 having memory(ies) 120, computing unit(s) 118 (computer processor(s)), and communication unit(s) (e.g., sensor(s) 114). Examples of such computing unit(s) may include virtual or physical computer processors, control units, micro-controllers, etc., which are coupled to other components of the platform(s) 112, such as one or more sensors 114, actuators, motivators, etc. The platform(s) 112 may be coupled to the network 102 via signal line 110, and may send and receive data to and from one or more of the server 106. In some embodiments, the platform(s) 112 are capable of transporting from one point to another. Non-limiting examples of the platform(s) 112 include a vehicle, an automobile, a bus, a boat, a plane, a bionic implant, or any other platforms with non-transitory computer electronics (e.g., a processor, a memory or any combination of non-transitory computer electronics).

The platform(s) 112 may include one or more sensors 114, an operating system 128, a mapping engine 130, software application(s) 116, computing unit(s) 118, memory 120, and a vehicle data store 122.

The vehicle data store 122 stores various types of vehicle data being communicated between different components of a given platform 112 using a bus, such as a controlled area network (CAN). In some embodiments, the vehicle data is collected from multiple sensors 114 coupled to different components of the platform(s) 112 for monitoring operating states of these components. Examples of the vehicle data include, but are not limited to, transmission, speed, acceleration, deceleration, wheel speed (Revolutions Per Minute—RPM), wheel slip, traction control information, windshield wiper control information, steering angle, braking force, etc. In some embodiments, the vehicle data may also include location data (e.g., GPS coordinates) describing current location of the platform(s) 114. Other standard vehicle data are also contemplated. In some embodiments, the vehicle data store 122 may be part of a data storage system (e.g., a standard data or database management system) for storing and providing access to data.

The sensor(s) 114 may include any type of sensors suitable for the platform(s) 112. The sensor(s) 114 may be configured to collect any type of signal data suitable to determine characteristics of a platform 112 and/or its internal and external environments. Non-limiting examples of the sensor(s) 114 include various optical sensors (CCD, CMOS, 2D, 3D, light detection and ranging (LIDAR), cameras, etc.), audio sensors, motion detection sensors, barometers, altimeters, thermocouples, moisture sensors, IR sensors, radar sensors, other photo sensors, gyroscopes, accelerometers, speedometers, steering sensors, braking sensors, switches, vehicle indicator sensors, windshield wiper sensors, geo-location sensors, wireless transceivers (e.g., cellular, WiFi™, near-field, etc.), sonar sensors, ultrasonic sensors, touch sensors, proximity sensors, etc.

The computing unit(s) 118 may execute software instructions (e.g., tasks) by performing various input/output, logical, and/or mathematical operations. The computing unit(s) 118 may have various computing architectures to process data signals. The computing unit(s) 118 may be physical and/or virtual, and may include a single core or plurality of processing units and/or cores. In some implementations, the computing unit(s) 118 may be coupled to the memory) 120 via the bus 124 to access data and instructions therefrom and store data therein. The bus 124 may couple the computing unit(s) 118 to the other components of the platform(s) 112 including, for example, the memory 120, the sensor(s) 106, and/or and the vehicle data 122.

The computing unit(s) 118 of the platform(s) 112 may receive and process the sensor data, send data to the sensor(s) 106, and communicate with other elements of the platform 112 via the bus 124, such as the vehicle data store 112, the memory 120, etc. In some embodiments, the computing unit(s) 118 may include electronic control units (ECU) implemented in the platform 112 such as a vehicle, although other platform types are also contemplated. The ECUs may receive and store the sensor data as vehicle operation data in the vehicle data store 122 for access and/or retrieval by the software application(s) 116, the operating system 128, and/or the mapping engine 130. In some embodiments, the computing unit(s) 118 may be virtual processors operable on underlying hardware. Tasks allocated for processing may be allocated to the ECUs and/or OS instances as depicted in FIGS. 2A and 2B, which are discussed further elsewhere herein.

It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc. For instance, the system 100 may include any number of platforms 112, and with respect to an automotive implementation, the platforms 112 may represent automobiles in various different scenarios, such as at a dealership, before driving, and during driving. These scenarios are discussed to illustrate different, non-limiting aspects of the technology.

In general, the computing device 126 of a platform 112 embodies a plug-and-play, dynamic system reflecting a platform where software application(s) 116 can be flexibly installed, updated, and activated. Any type of software application 116 is applicable. In this disclosure, various examples of general-purpose and customized software are discussed, although it should be understood that these examples are non-limiting. Some non-limiting examples of software application(s) 116 include automotive software, including control, ADAS, autonomous driving, and infotainment applications.

Figures 2A, 2B:
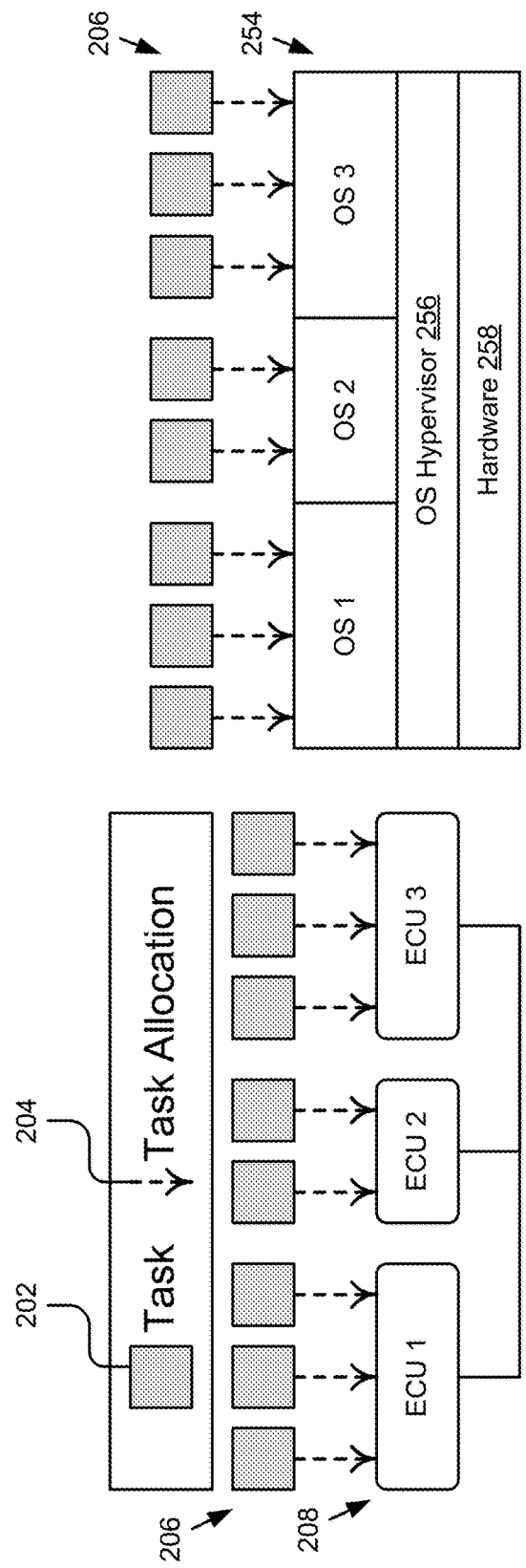
FIGS. 2A and 2B are block diagrams of example systems.

As shown in FIGS. 2A and 2B, and as discussed in further detail herein, from an implementation perspective, an example dynamic, plug-and-play system may include a software application 116, represented by a set of tasks 206, running on distributed Electronic Control Units (ECUs) 208 or separated operating systems 254 supported by virtualization techniques such as OS hypervisors 256 and suitable underlying hardware 258. For instance, as shown in FIG. 2A, the set of tasks 206 includes groups of tasks 202 that have been respectively allocated to different ECUs (e.g., ECU 1, ECU 2, and ECU3), and in FIG. 2B, the set of tasks 206 includes groups of tasks 202 that have been respectively allocated for processing to different OS instances (e.g., OS 1, OS 2, and OS 3).

The following scenarios are non-limiting examples of where plug-and-play automotive software applications 116 could be utilized, but it should be understood that other plug-and-play applications are also possible and contemplated.

At Dealership

Traditionally, customers can only purchase available vehicles at dealerships or wait until specific vehicles shipped from other dealerships or factories. As more software applications 116 are installable at dealerships, vehicles can be customized and delivered to customers much sooner. This can effectively enhance user experience by providing desired settings for customers and reducing waiting time.

Before Driving

In some cases, it is desirable to install software applications 116 before driving (e.g., critical updates, safety patches, system enhancements, optional features, fuel efficiency improvements, etc.). For example, the computing devices 126 of some vehicles have been able to perform software application 116 updates overnight through a wireless data connection (e.g., cellular or WiFi™ connection). In a further example, different drivers that share vehicles in a vehicle-sharing service may have subscriptions to different applications 116. After a user books a shared vehicle via web-based application of the service, the server may transmit, via a wireless network connection, instructions to a sensor(s) 114 (wireless transceiver) of the vehicle including data indicating which applications to load, retain, and/or configured on the computing device 126 of the booked vehicle in association with the user, and the vehicle computing device 126 may efficiently perform these plug-and-play operations using the techniques described herein.

During Driving

Although there may be more limitations during driving due to safety considerations, software installation, update, and activation (or deactivation) may be efficiently performed by the computing device 126 of the vehicle using the techniques described herein. These operations may be triggered by the operating system 128 automatically or in response to manual input and/or instructions received from the deployment application 108. In some embodiments, the triggering may depend on various condition(s) including, but not limited to, environmental conditions (e.g., road conditions or weather conditions) and traffic regulations (e.g., speed limit, allowance of some specific ADAS and/or autonomous functions, etc.). The conditions may be determined by the computing device 126 of the vehicle based on sensor data received from the sensors 114 of the vehicle, data received from the vehicle data store 122 of the vehicle, pre-stored preferences retrievable from memory 120, and/or data from other data sources.

In some embodiments, depending on corresponding paths, an application P may be partitioned into four subsets $P_=$, $P_{\mp}$, $P_\times$, and depending on the corresponding paths, the task set T and the signal set S are also partitioned into disjoint subsets, $P_=$, $P_{\mp}$, $P_\times$ and $S_=$, $S_{\mp}$, $S_+$, $S_\times$, and shown in FIG. 13. The subset of paths, tasks, and signals may be disjoint in some cases. $P_=$ represents the set of paths/applications which have been mapped and cannot be remapped. $P_{\mp}$ represents the set of paths/applications which have been mapped and can be remapped. $P_+$ represents the set of paths/applications which have not been mapped and are going to be mapped. $P_\times$ represents the set of paths/applications which have not been mapped and are not going to be mapped. As shown, traditional design methods have $P_+=P$ and $P_==P_{\mp}=P_\times=0$, meaning that all paths/applications in P are mapped during development/design.

The mapping engine 130 may use different settings depending on which scenario may be applicable. Example settings are shown in table 900 depicted in FIG. 13 and an example method 400 for applying the settings is shown in the diagram depicted in FIG. 4. In the method 400, problem setting 1 may be applied at dealership or before driving to map and activate initial application(s) 116. Some application(s) 116 may be suited for installation later (e.g., during driving, and as an operator starts driving 412, problem settings 2, 3, or 4 may be applied as applicable. As driving ends 424, problem setting 1 in block 402 may again be applied to restore an initial state.

During driving 410, after activating applications 414 (e.g., a lane keeping system and/or pre-collision system), problem setting 2 may be applied in block 404 without changing mapped application(s) 116. If the application(s) 116 are successfully activated 414 and address certain requirement(s) in block 404, corresponding solution found signal(s) 416 may be returned by the mapping engine 130 and normal operation may continue. If the activated application(s) 116 and the operations performed in block 404 do not meet the requirement(s), no solution found signal(s) 426 may be returned and problem setting 3 may be applied in block 406 to activate application(s) 116 by remapping some mapped applications (in $P_{\mp}$). The application of problem setting 3 in block 406 may return data describing solution(s) or warning(s) 418. The solutions or warnings may be presented to the operator (e.g., audibly, visually, using tactile feedback, etc.) to indicate whether or not solutions were found. During driving 410, problem setting 4 may be applied after deactivating 420 some applications (e.g., a infotainment system application that is running may be stopped momentarily and reallocated to a different computing unit so a lane keeping application may be preferentially allocated). Responsive to application of setting 4 in block 408, a solution signal 422 may indicate a result of the application of problem setting 4.

Figure 4:
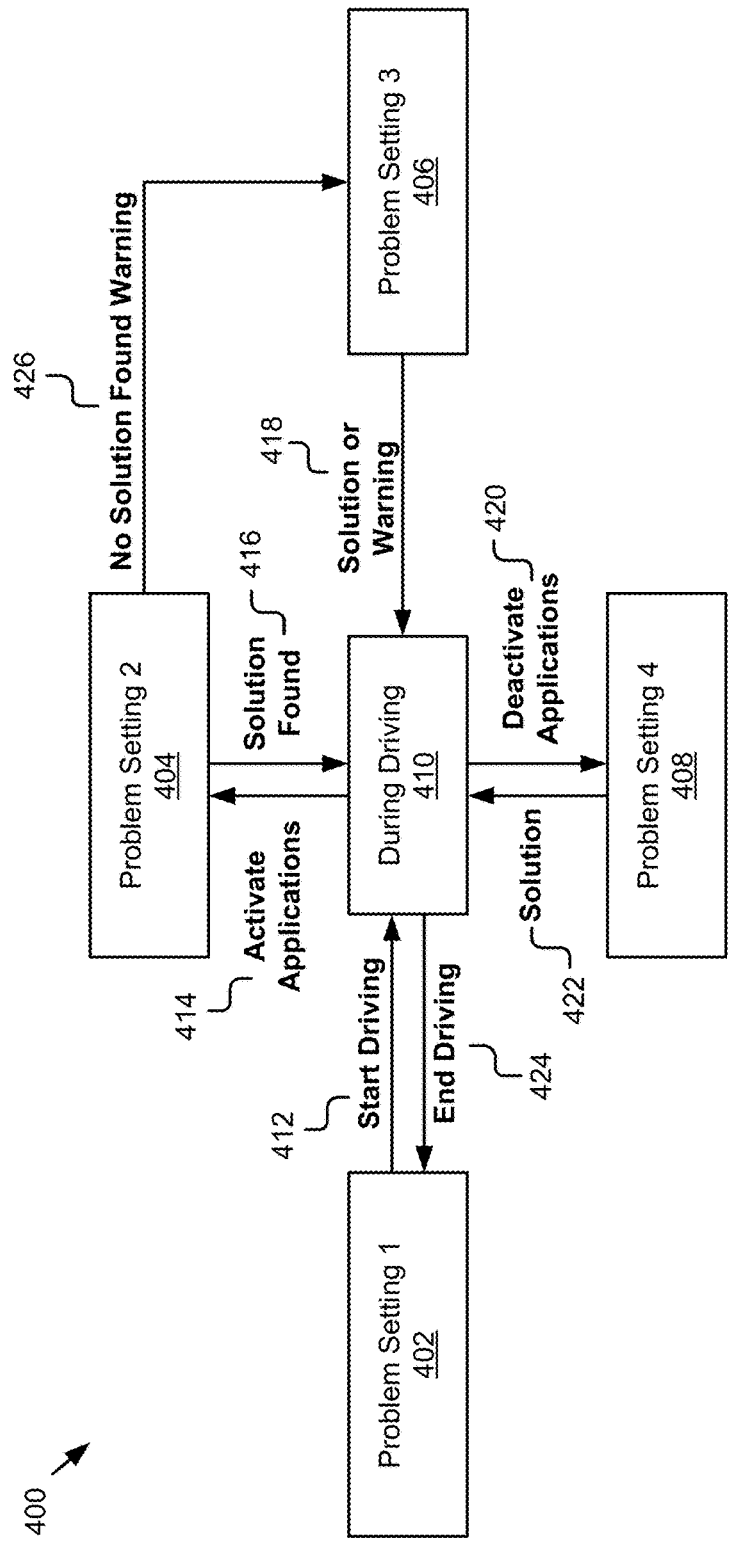
FIG. 4 depicts a flowchart illustrating example scenarios in which applications are activated during driving.

The mapping engine 130 may evaluate the successful activation rate of paths/applications in $P_\times$. The mapping engine 130 may determine that each single path/application $\pi_i \in P_\times$ will be activated next and applies problem setting 2 with $P_+=\{\pi_i\}$ and checked its feasibility (e.g., successful activation rate). The flexibility may be computed as the ratio of the number of feasible activations to $|P_+|$. FIG. 4 depicts example scenarios in which applications are activated during driving. As such, efficiency (the runtime of a mapping algorithm) in these scenarios for some or certain application(s) 116 may be important to ensure safe operation of the vehicle (e.g., braking application, lane assist application, etc.).

Referring again to FIG. 1, the server 106 may include a deployment application 108. The deployment application 108 includes software and/or hardware logic executable by the server 106 to manage deployment of the software application(s) 116 on the platform(s) 112. The deployment application 108 may store a list of applications for each platform 112 in a data store (not depicted), such as a database hosted by a database management system executable by the server 106. The list of applications for each platform 112 may be indexed using a unique identifier identifying the platform 112. The list of applications may be updated by a stakeholder associated with the platform 112. The stakeholder may be associated with a unique user identifier, which may be correlated in the database with the corresponding list of applications and the platform 112. A given list of applications may indicate which versions of software applications are installed on the platform 112 to which the list corresponds, which software applications have yet to be installed on the platform 112, and which software applications need to be removed from the platform 112. The deployment application 108 may transmit software application configuration instructions to the platforms 112 for interpretation and execution thereby. The configuration instructions may indicate which applications 116 to update, remove, and/or install.

The operating systems 128 of the platforms 112 may interpret the configuration instructions and perform the corresponding update, remove, and/or install operations. For instance, the configuration instructions may indicate to install a previously uninstalled software application 116, and the operating system 128 may retrieve the installation package from the server 106 or a local data store (e.g., the memory 120) and install the software application 116, or enabling access to a previously installed instance of the software application 116 by an operator. In another example, the configuration instructions may indicate to update or remove/uninstall a software application 116, and the operating system 128 may interpret the instructions and perform the update (e.g., by downloading the new version of/patch to the software application 116) or remove the software application 116 (e.g., by deleting the software application 116 from the memory 120 or preventing access to the software application by the operator).

In some embodiments, an operating system 128 of a platform 112 may manage the set of software applications 116 for that platform 112, which, in some cases, may vary based on the operator of the platform 112. As different operators log onto or are scheduled to use the platform 112, the operating system 128 may switch the set of software applications 116 that are installed on the platform 112, thereby customizing the suite of software applications 116 available to the operator. Other variations are also possible and contemplated.

The mapping engine 130 includes software and/or hardware logic executable by a computing unit 118 to capture a system model comprised of a function model including the set of software application(s) 116 to be executed on the platform 112 and the architectural platform of the computing device 126 for executing the set of software application(s) 116. In some embodiments described herein, the system model and corresponding timing models, methods, etc., are described with reference to the notations of elements, sets, constant parameters, decision variables, and dependent variables listed in table 700 show in FIG. 11.

The memory 120 may store attributes describing the architectural platform and/or the operating system 128 may dynamically determine the attributes responsive to a procedure call. The mapping engine 130 may query the operating system 128 of the platform and/or the memory 120 to capture the attributes of the architectural platform.

The operating system 128 controls basic functions of the platform, executes applications, controls peripherals (e.g., sensor(s) 114) and/or other components, and performs other standard operations and functions. The operating system 128 may interpret the set of tasks and the set of signals of each software application 116 to be executed, and the mapping engine 130 may receive and process the set(s) of tasks and the set(s) of signals, generate a task graph, and map the components of the task graph to the components of the architectural model.

The operating system 128, the mapping engine 130, and/or the software application(s) 116 include software and/or hardware logic executable to perform the respective operations discussed herein. In some embodiments, the operating system 128, the mapping engine 130, and/or the software application(s) 116 may be implemented using software executable by one or more of the computing unit(s) 118, using hardware, such as but not limited to a field-programmable gate array (FPGA), an application-specific integrated circuit (ASIC), etc., and/or a combination of hardware and software, etc. In some embodiments, the operating system 128, the mapping engine 130, and/or the software application(s) 116 may be stored in computer memory, such as the memory 120.

In some embodiments in which the computing unit(s) comprise electronic control unit(s) (ECU(s)), engine control module(s) (ECM(s)), power-train control module(s) (PCM(s)), etc., one or more of the control unit(s) 118 may AUTOSAR/OSEK-compliant operating systems that support fixed-priority preemptive scheduling. A network coupling plural computing units 118 may support fixed-priority preemptive scheduling, which is an abstraction of time-sensitive networking (TSN) and time-triggered Ethernet (TTE). Nevertheless, in various embodiments where a pair of tasks on the same computing unit(s) cannot not have the same priority, a pair of messages on the network may have the same priority, where the first-in first-out scheduling is applied for messages with the same priority. In further embodiments, the timing model of the network can be replaced by that of an OS hypervisor to match the distributed platform, as shown in FIG. 2B. It should be understood that this disclosure is not limited to fixed-priority preemptive schedule and that other suitable configurations are also possible and contemplated.

Figure 3A:
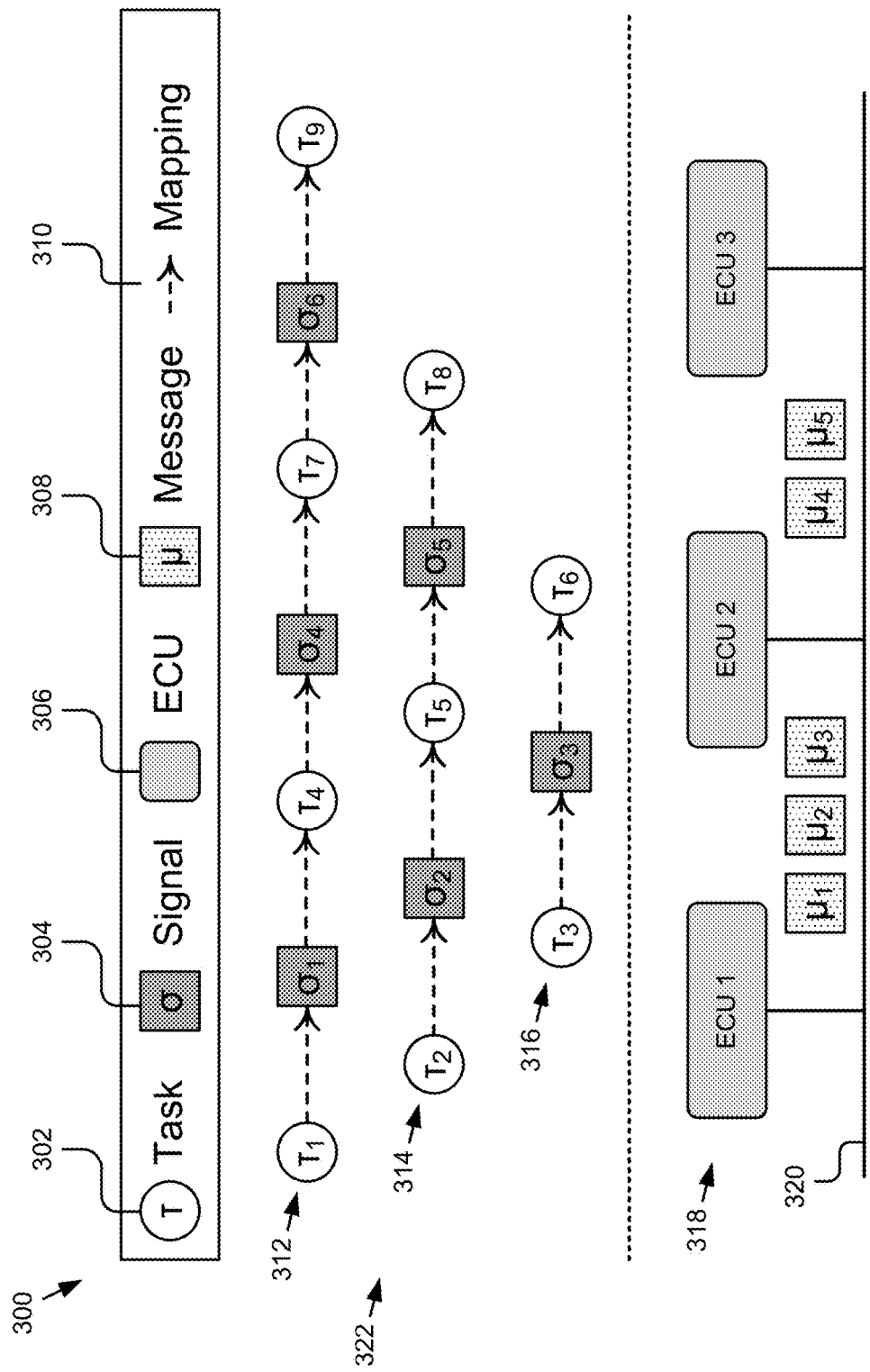
FIGS. 3A and 3B are block diagrams illustrating an example system model, which includes a functional model and an architectural platform.
Figure 3B:
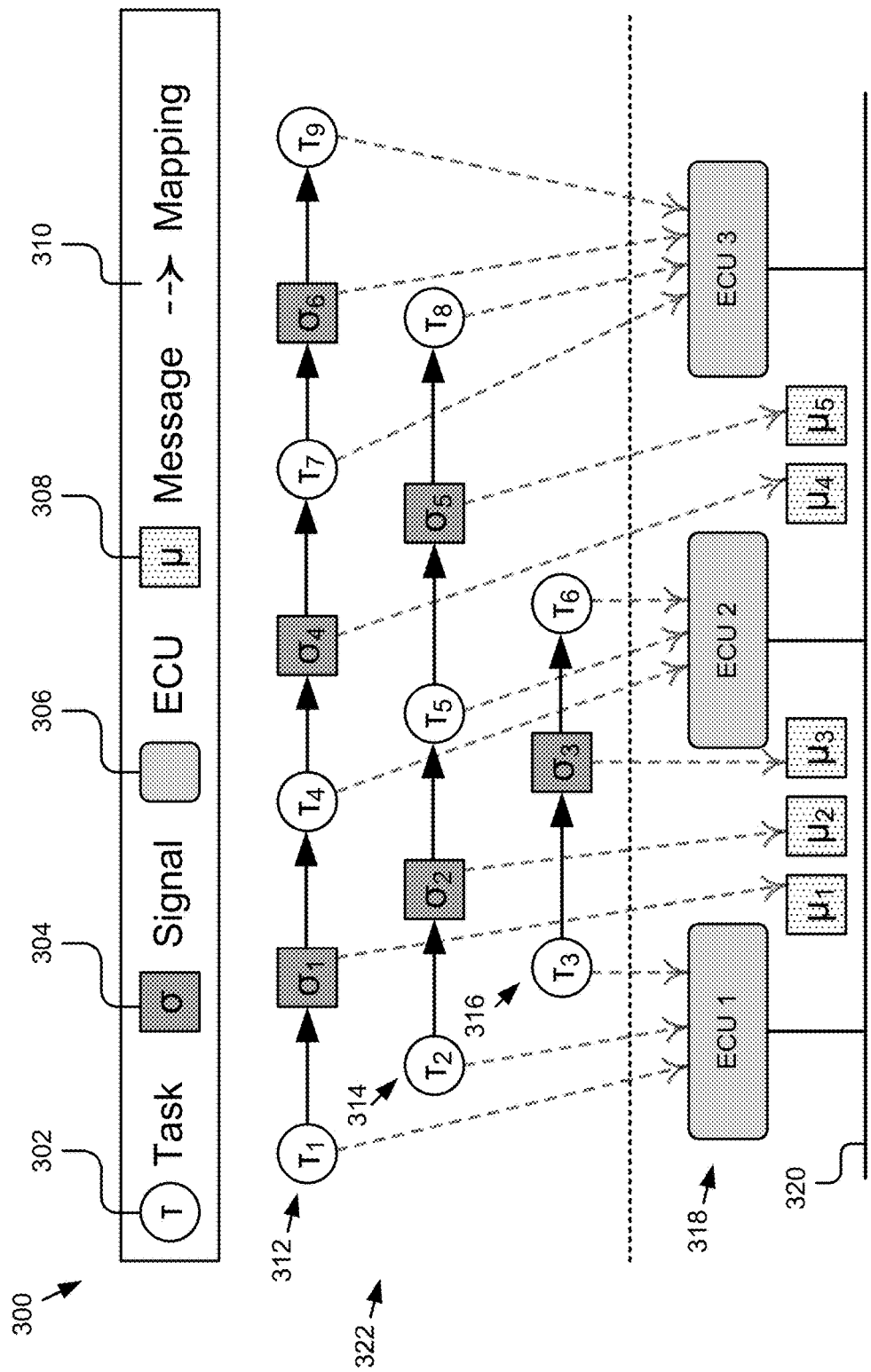

FIGS. 3A and 3B are block diagrams illustrating an example system model 300, which includes a functional model 322 and the architectural platform 318. The functional model 322 comprises a task graph including:

A set of tasks, denoted by, and $T=\{\tau_1, \tau_2, \ldots, \tau_{|T|}\}$

A set of signals, denoted by $S=\{\sigma_1, \sigma_2, \ldots, \sigma_{|S|}\}$

Tasks and signals are activated periodically, and signals have their source and destination tasks. A path $\tau$ represents an application which includes sensing, computing, and actuating. The mapping engine 130 defines the path by an interleaving sequence of tasks and signals. The architectural platform is a distributed platform comprising:

A set of identical ECUs, denoted by $E=\{\xi_1, \xi_2, \ldots, \xi_{|E|}\}$,

A set of messages, denoted by $M=\{\mu_1, \mu_2, \ldots, \mu_{|M|}\}$, and

A network connecting the ECUs.

In embodiments where the ECUs and the network are replaced by other computing architecture, such a set of operating systems, and an OS hypervisor and underlying hardware (as shown in FIG. 2B), the system model can match the distributed platform 254. Other architectural platforms are also possible and contemplated.

With reference to FIGS. 3A and 3B, during mapping, tasks 302 are allocated to computing units 306, whether virtual or physical, and their priorities are assigned. If the source and destination tasks 302 of a signal 304 are allocated to different computing units 306, the signal 304 is mapped to a message 308 on the communication network 302, and its priority is assigned. For instance, since source task $T_1$ is mapped to $ECU_1$ and destination task $T_4$ is mapped to $ECU_2$, the signal $\sigma_1$ is mapped to message $\mu_1$ on the network 320. This type of signal is defined as an external signal.

In contrast, if the source and destination tasks 302 of a signal are allocated to the same ECU 306, the signal 304 may, in some cases, not be mapped to any message. For instance, since source task $T_7$ is mapped to $ECU_3$ and destination task $T_9$ is also mapped to $ECU_3$, the signal $\sigma_6$ is not mapped to any message on the network 320. This type of signal is defined as an internal signal.

In some embodiments, external signals 304 are respectively packaged into separate messages 308 on the network 320 in a 1:1 relationship rather than packing multiple signals 304 into one message 308 on the network 320. This is advantageous because it reduces the network load generated by message headers, and allows for effective processing on a limited bandwidth network, such as a CAN. In an example, the data rate of a CAN protocol can be 1 Mbps with connection lengths below 40 meters, and it is often set to 500 Kbps for evaluation, although other data rates are also applicable and contemplated. However, in other embodiments not having similar header processing and/or bandwidth limitations, multiple signals 304 may be packaged in a single message 308. For instance, a network load generated by message headers may not be a significant concern for some plug-and-play automotive systems that use networks with higher bandwidth, such as Ethernet having data rates of 100-1,000+ Mbps.

In some embodiments, the mapping engine 130 may utilize timing models for latency computation. As an example, the timing models may be used for worst-case latency computation, although other prioritization and/or weighting may be utilized.

Assuming that the worst-case response time $r_{\tau_i}$ of $\tau_i$ is smaller than the activation period $T_{\tau_i}$ of $\tau_i$ (this will be a constraint), $r_{\tau_i}$ is calculated by an iterative method:

$$r_{\tau_i} = C_{\tau_i} + \sum_{\tau_j \in T_H(i)} \left\lceil \frac{r_{\tau_i}}{T_{\tau_j}} \right\rceil C_{\tau_j}, \quad (1)$$

where $C_{\tau_i}$ is the execution time (e.g., on the computing unit(s) 118) of $\tau_i$ and $T_H(i)$ is the set of higher-priority tasks on the same computing unit 118 of $\tau_i$.

Assuming that the worst-case response time $r_{\mu_i}$ of $\mu_i$ is smaller than the activation period $T_{\mu_i}$ of $\mu_i$ (which may also be a constraint), $r_{\mu_i}$ is calculated similarly as:

$$r_{\mu_i} = C_{\mu_i} + \sum_{\mu_j \in M_{HS}(i)} \left\lceil \frac{r_{\mu_i}}{T_{\mu_j}} \right\rceil C_{\mu_j}, \quad (2)$$

where $C_{\mu_i}$ is the transmission time (on the network) of $\mu_i$ and $M_{HS}(i)$ is the set of higher or same-priority messages of $\mu_i$ (but may not include $\mu_i$ itself) on the network.

If a signal $\sigma_i$ is external, its worst-case response time $r_{\sigma_i}$ is equal to $r_{\mu_i}$; otherwise, $\rho_i = 0$.

The worst-case latency $l_\pi$ of $\pi$ is calculated as:

$$l_\pi = \sum_{\tau_i \in T_\pi} r_{\tau_i} + \sum_{\tau_i \in T'_\pi} T_{\tau_i} + \sum_{\sigma_i \in S_\pi} r_{\sigma_i} + \sum_{\sigma_i \in S'_\pi} T_{\sigma_i}, \quad (3)$$

where $T_\pi$ is the set of tasks in $\pi$, $T'_\pi$ is the set of destination tasks of external signals in $\pi$, $S_\pi$ is the set of signals in $\pi$, and $S'_\pi$ is the set of external signals in $\pi$.

In some embodiments described herein, that task activation and signal activation may be asynchronous, as reflected by terms $T_{\tau_i}$ and $T_{\sigma_i}$ in Equation (3). Synchronous signal or message activation may be supported by the network 320 (e.g., TSN and TTE). However, event-triggered tasks may in some cases not be synchronizable (although their activation periods may be bounded). Other suitable timing models that may also be applied and the mapping approaches described herein used.

The following are example inputs, decision variables, constraints, and different problem settings that corresponding to different scenarios and evaluation metrics.

Example inputs for the system model 300 including the functional model 322 and the architectural model 318 may include:

Each $\tau_i$ is associated with its activation period $T_{\tau_i}$ and execution time $C_{\tau_i}$;

Each signal $\sigma_i$ is associated with its activation period $T_{\sigma_i}$ and data length $L_{\sigma_i}$;

Each message $\mu_i$ is associated with its activation period $T_{\mu_i} = T_{\sigma_i}$ and transmission time $C_{\mu_i}$, where $C_{\mu_i}$ is defined as:

$$C_{\mu_i} = \frac{L_{\sigma_i} + L}{B}, \quad (4)$$

where L is the length of a message header and B is the network bandwidth; and

Each path/application $\mu_i$ is associated with its deadline $D_{\pi_i}$.

In a 1:1 signal to message mapping, if a signal $\sigma_i$ is external, the signal may be mapped to $\mu_i$ directly.

Example decision variables may include allocation $a_i$ and priority $p_i$ for each task $\tau_i$ and priority $q_i$ for each message $\mu_i$. However, to support the design of plug-and-play automotive systems, some decision variables may become given parameters in some cases, as discussed in further detail below.

Example constraints may include:

Constraint 1—for any $\tau_i$, $\tau_j$, if i≠j and $a_i = a_j$, then $p_i \neq p_j$. In other words, different tasks on the same computing unit 118 may have different priorities, although different messages on the network can have the same priority.

Constraint 2—for any $\tau_i$, $r_{\tau_i} \leq T_{\tau_i}$. In other words, the worst-case response time of a task may be smaller than or equal to the activation period of the task.

Constraint 3—for any $\sigma_i$, $r_{\sigma_i} \leq T_{\sigma_i}$. In other words, the worst-case response time of a signal should be smaller than or equal to the activation period of the signal.

Constraint 4—for any $\pi_i$, $l_{\pi_i} \leq D_{\pi_i}$. In other words, the worst-case latency of a path/application should be smaller than or equal to the deadline of the path/application.

Figure 5:
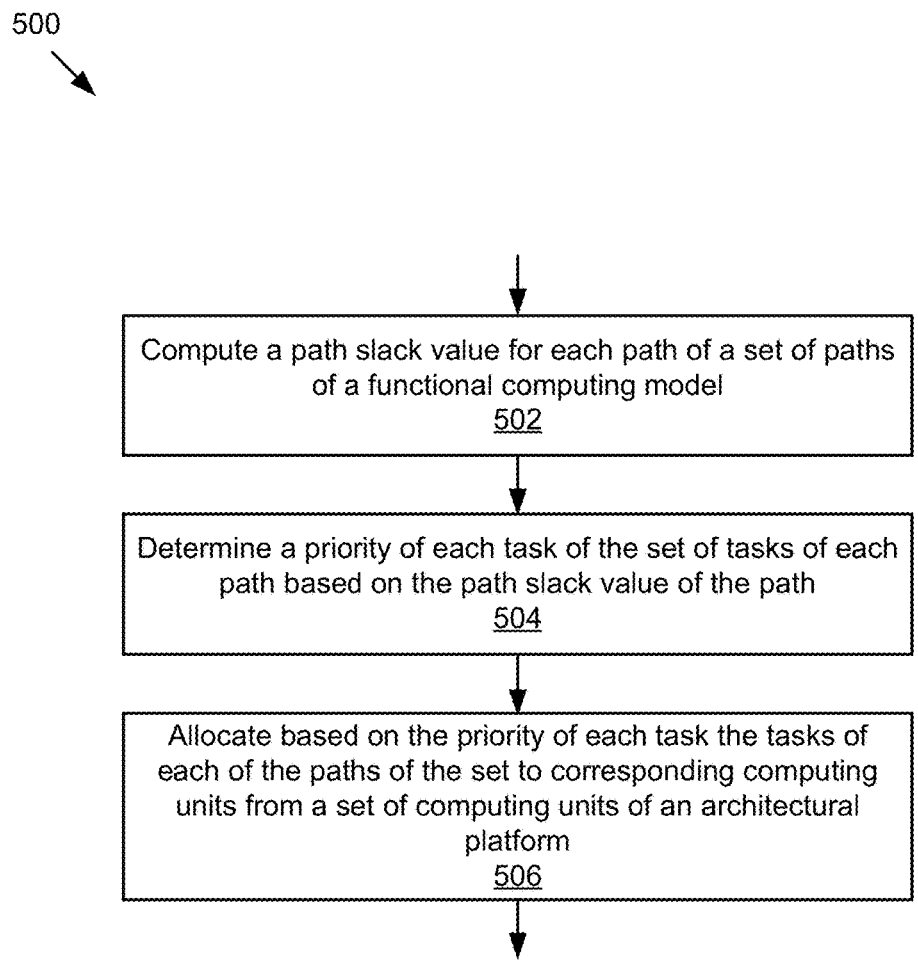
FIG. 5 is a flowchart of an example method for mapping tasks for execution by computing units.

In some embodiments, the mapping engine 130 may map tasks for execution and post-process the mapped tasks. FIG. 5 is a flowchart of an example method 500 for mapping tasks for execution by computing units 118. In automotive embodiments, the method 500 provide effective task mapping in dynamic scenarios such as under problem settings 1, 3, and 4, although it is applicable to other scenarios as well.

In block 502, the mapping engine 130 computes a path slack value for each path of a set of paths of a functional computing model. Each path of the set of paths comprises a set of tasks. The path slack value of each path may reflect a difference between a deadline and a latency of the path, and may be computed or pre-determined.

In some embodiments discussed herein, tasks of paths having the lowest slack values are given the highest priority and the tasks of paths having the highest slack values are given the lowest priority. The mapping engine 130 processes the unprocessed task of the path having the highest priority in order in which the tasks are included in the path.

In some embodiments, if the path slack value of a target path is positive and large relative to other paths, that indicates the constraint is relatively not as tight and that the mapping engine 130 has more flexibility in mapping. If path slack value is relatively very small, that indicates the constraint is relatively very tight and that less flexibility is available. In the case the path slack value is negative, that indicates the constraint is currently in violation and needs adjusting.

Figure 7:
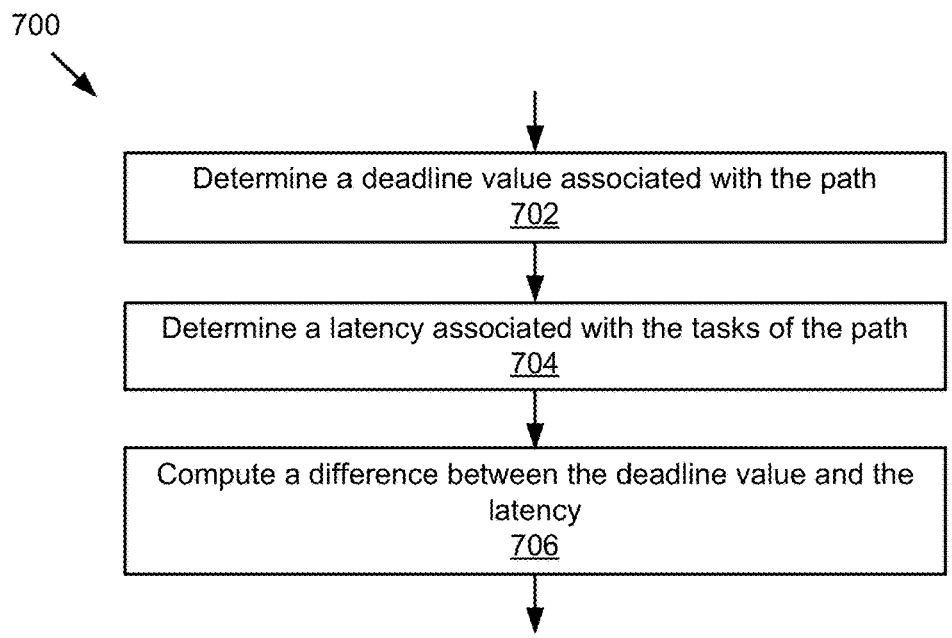
FIG. 7 is a flowchart of an example method for determining the slack of a path.

In some embodiments, the mapping engine 130 may determine the slack of a path using the method 700 of FIG. 7. In block 702, the mapping engine 130 may determine a deadline value associated with the path, in block 704, the mapping engine 130 may determine a latency associated with the tasks of the path, and in block 706, the mapping engine 130 may compute a difference between the deadline value and the latency.

In some embodiments, the mapping engine 130 may determine latency based on response times and/or activation periods associated with the target path. In some embodiments, the response time or deadline may initially be set to an activation period, which may be predefined. In some embodiments, as tasks are allocated, the mapping engine 130 computes response time to determine whether it is smaller than or equal to the activation period. If it is, the mapping engine 130 uses the response time. Otherwise, the mapping engine may use the activation period or other constant.

In some cases, the activation period for each type of signal is fixed and different signals may have different activation periods. For example, for a first signal, the period may be 100 msec, and for a second period, the activation period may be 200 msec. In some embodiments, the pre-defined constants, such as activation periods, may be stored in the memory 120 and/or the vehicle data store 122.

Figure 8:
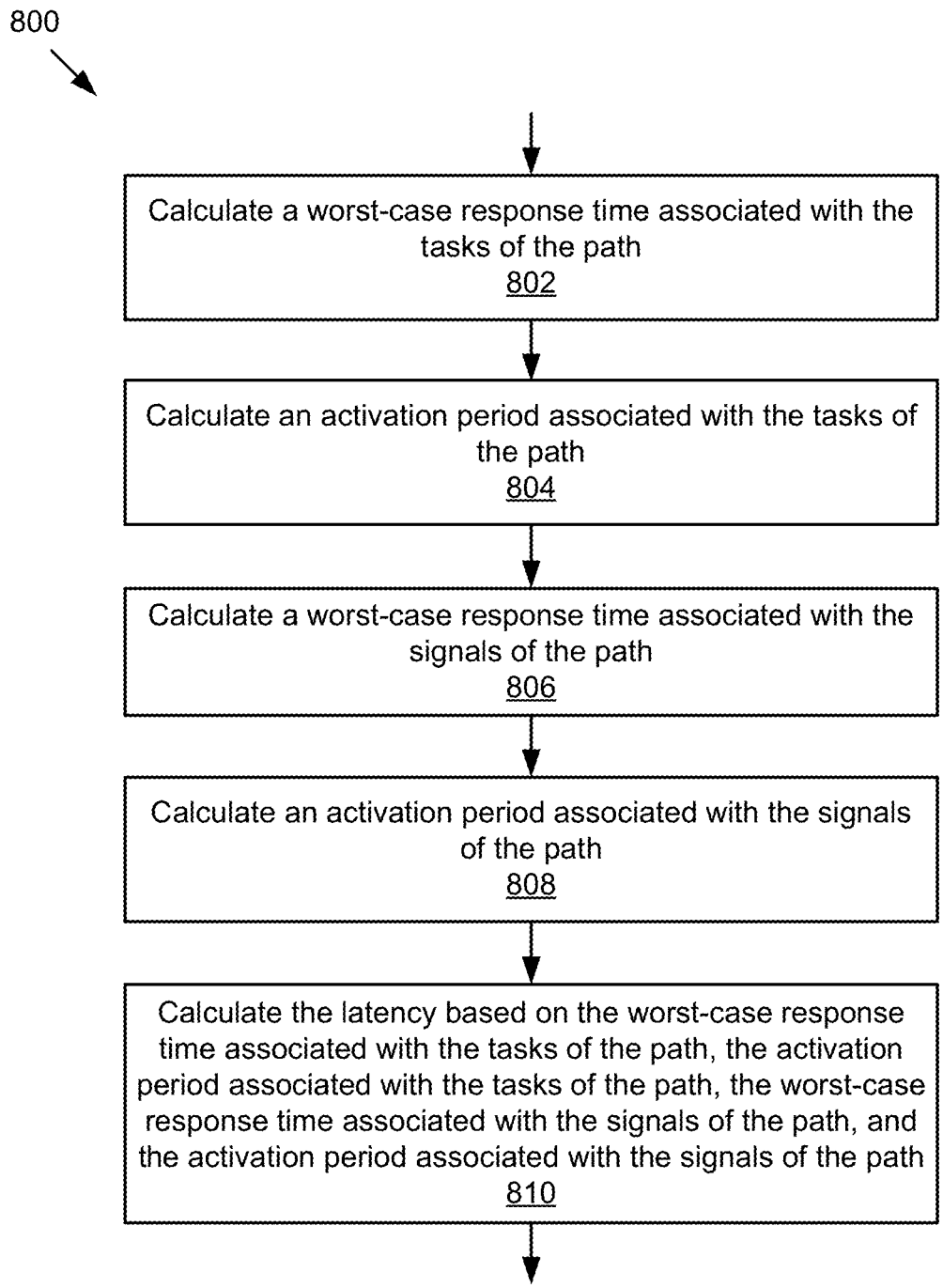
FIG. 8 depicts an example method for determining latency.

FIG. 8 depicts an example method 800 for determining latency. Under this method 800, the mapping engine 130, in block 802, calculates a worst-case response time associated with the tasks of the path; in block 804, calculates an activation period associated with the tasks of the path; in block 806, calculates a worst-case response time associated with signals of the path; in block 808, calculates an activation period associated with the signals of the path; and, in block 810, calculates the latency based on the worst-case response time associated with the tasks of the path, the activation period associated with the tasks of the path, the worst-case response time associated with the signals of the path, and the activation period associated with the signals of the path, as discussed elsewhere herein.

As a further example, the slack of a path $\pi_i$ may be defined as:

$$s_{\pi_i} = D_{\pi_i} - l_{\pi_i} \quad (5),$$

where $D_{\pi_i}$ the deadline and $l_{\pi_i}$ is the latency of the path $\pi_i$, each of which may be constants (e.g. initially) and/or computed as discussed elsewhere herein.

In some embodiments, if the allocation of a task has not been decided or the response time of a task or a signal has not been computed, the mapping engine 130 may be unable to compute $l_{\pi_i}$ and $s_{\pi_i}$, in which case, the mapping engine 130 may replace the response time of a task or a signal with the activation period of the task or the signal, and the signal may regarded as an external signal if it cannot be determined. Accordingly, the following equation reflects an initial slack of a path $\pi_i$ as having a value initially equal to:

$$s_{\pi_i} = D_{\pi_i} - \sum_{\tau_i \in T_\pi} T_{\tau_i} - \sum_{\tau_i \in T'_\pi} T_{\tau_i} - \sum_{\sigma_i \in S_\pi} T_{\sigma_i} - \sum_{\sigma_i \in S'_\pi} T_{\sigma_i} \quad (6)$$

-continued
$$= D_{\pi_i} - \sum_{\tau_i \in T_\pi} T_{\tau_i} - \sum_{\tau_i \in T'_\pi} T_{\tau_i} - 2\sum_{\sigma_i \in S_\pi} T_{\sigma_i}.$$

The slack of a task $\tau_i$ may be defined as:

$$s_{\tau_i} = \min\left\{0, \min_{\{\pi_j | \tau_i \in \pi_j\}} s_{\pi_j}\right\}, \quad (7)$$

and the slack of a signal $\sigma_i$ may be defined as $$s_{\sigma_i} = \min\left\{0, \min_{\{\pi_j | \sigma_i \in \pi_j\}} s_{\pi_j}\right\}. \quad (8)$$

Returning to FIG. 5, in block 504, the mapping engine 130 determines a priority of each task of the set of tasks of each path based on the path slack value of the path. The mapping engine 130 then allocates in block 506, based on the priority of each task, the tasks of each of the paths of the set to corresponding computing units from a set of computing units of an architectural platform, such as the computing device 126 of a vehicle.

Figure 6:
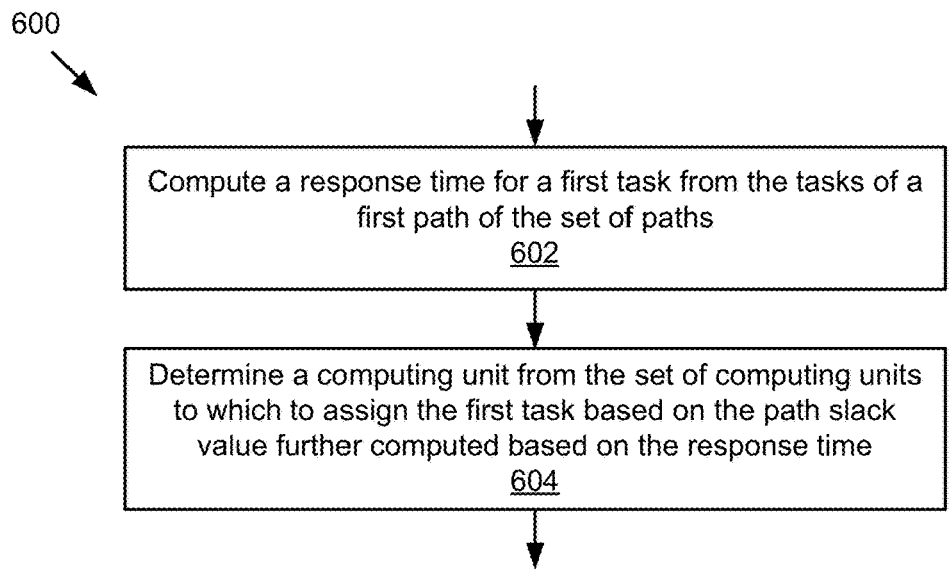
FIG. 6 is a flowchart of an example method for computing path slack values based on response time.

In some embodiments, the mapping engine 130 may allocate tasks based on response time. FIG. 6 is a flowchart of an example method 600 for computing path slack values based on response time. In block 602, the mapping engine 130 computes a response time for a first task from the tasks of a first path of the set of paths. The first task has a priority higher than the priorities of other non-allocated tasks of the path. In block 604, during allocation (e.g., block 506 of the method 500), the mapping engine 130 may determine a computing unit (from the set of computing units) to which to assign the first task based on the path slack value of one or more of the paths of the set. The path slack value used in block 604 is further computed based on the response time, as discussed elsewhere herein. The method 600 may repeat the response time determination and use it for allocation for any other paths being processed, provided sufficient information for the response time computation is available. Otherwise, the method 600 may use activation time or other values to approximate the response time.

A further non-limiting example of an algorithm 1400 for allocating tasks based on path slack, task priority, and, in some cases, response time, is shown in FIG. 14. As depicted, the algorithm 1400 allocates tasks in $T_\mp \cup T_+$ to computing units (e.g., ECUs, OS instances, etc.) one by one. In each iteration, the algorithm 1400 computes the slacks of related paths (e.g., other paths associated with the application, related programs, etc.) and non-allocated tasks and sorts non-allocated tasks by ascending slack (Lines 1-5). If the first non-allocated task is $\tau_i$, the next possible task priority is assigned to $\tau_i$ (Lines 5-7).

Next, the algorithm attempts to allocate $\tau_i$ to each computing unit (Lines 8-16) and selects a feasible allocation. The $r_{\tau_i}$ of $\tau_i$ is computed, and may be the slacks of the $\tau_i$ and other tasks in the path using $r_{\tau_i}$ (Line 10), since the slack of the $\tau_i$ is associated with the path to which $\tau_i$ belongs, the slacks for any other tasks in that path does not require separate computation.

An example of a feasible allocation is determined based on the largest summation of all path slacks (Line 17). For example, assuming X is the summation of all path slacks, the algorithm may determine that:
If a task is allocated to ECU 1, X would be 20,000.
If a task is allocated to ECU 2, X would be 10,000.
If a task is allocated to ECU 3, X would be 30,000.

In this non-limiting example, a feasible allocation may be determined based on the largest summation of all path slacks, or in other words, the task may be allocated to ECU 3 because it has the largest X.

The algorithm 1400 updates the response time of $\tau_i$ (Line 18). Similar operations are also applied to external signals in $S_= \cup S_+$ (Lines 20-28). However, in the case of signals, no computing unit selection is required.

The mapping techniques discussed herein have several benefits over other approaches. First, in priority based embodiments, the techniques are efficient because tasks with higher priorities are allocated earlier (e.g., a higher-priority task can preempt a lower-priority task). As a result, in some cases, the techniques can avoid having to recompute the response time of a task which is allocated earlier.

Secondly, the techniques are particularly suitable for incremental design of plug-and-play automotive systems. Because of the same property (e.g., tasks with higher priorities being allocated earlier), the impact on tasks allocated earlier or tasks in $T_=$ may be unconsidered, which may be beneficial for problem settings 3 and 4. These benefits further apply not only to tasks but also signals. Thirdly, the mapping techniques, which are based on path slack values, are applicable to other timing models (e.g., for worst-case latency computation).

Figure 10:
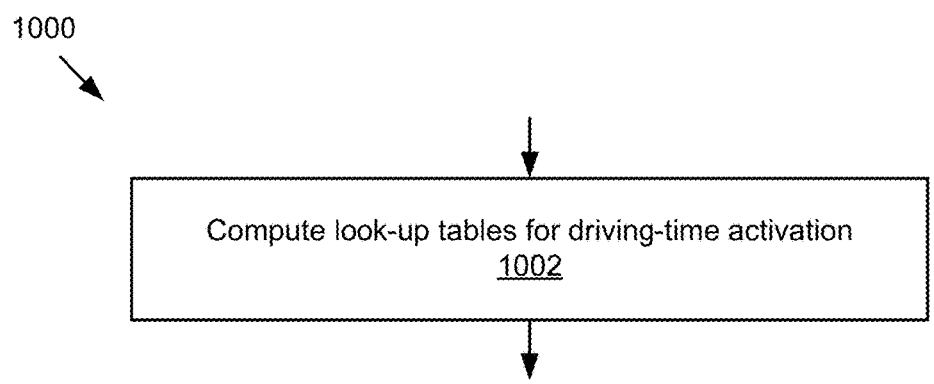
FIG. 10 is a flowchart of an example method for post-processing output.

Upon mapping tasks to computing units, the mapping engine 130 may post-process the output for driving-time activation. In some embodiments, the mapping engine 130 may compute lookup tables for the driving-time activation as shown in block 1002 of the method 100 depicted in FIG. 10. In an example using $P_x$, the mapping engine 130 stores look-up data in tables for each: $\tau_i, \tau_j \in T_x, \sigma_i \in S_x,$ and $\varepsilon_k \in E$ using the algorithm 1500 depicted in FIG. 15. The algorithm 1500 computes and stores the tables based on the timing models and the definitions of the tables. When a path/application is to be activated, the mapping engine 130, operating system 128, or another component, can immediately activate it utilizing the data stored in the tables.

Continuing with the example using $P_x$, the following may be used.

$r_0(\sigma_i)$: the response time of $\sigma_i$ if all signals in S are external signals and $\mu_i$ (the mapped message of $\sigma_i$) has the lowest priority on the network.

$$f_0(\sigma_i){:}f_0(\sigma_i) = \begin{cases} 0, & \text{if } r_0(\sigma_i) > T_{\sigma_i} \\ 1, & \text{otherwise.} \end{cases} \quad (9)$$

$r_1(\tau_i, \varepsilon_k)$: the response time of $\tau_i$ if $\tau_i$ is allocated to $\varepsilon_k$ and $\tau_i$ has the lowest priority (all other tasks in $T_x$ are not allocated).

$$f_1(\tau_i, \varepsilon_k){:}f_1(\tau_i, \varepsilon_k) = \begin{cases} 0, & \text{if } r_1(\tau_i, \varepsilon_k) > T_{\tau_i} \\ 1, & \text{otherwise.} \end{cases} \quad (10)$$

$r_2^H(\tau_i, \tau_j, \varepsilon_k)$: the response time of $\tau_i$ if $\tau_i$ and $\tau_j$ are allocated to $\varepsilon_k, \tau_i$ has the second-to-lowest priority, and $\tau_j$ has the lowest priority (all other tasks in $T_x$ are not allocated).

$r_2^L(\tau_i, \tau_j, \varepsilon_k)$: the response time of $\tau_j$ if $\tau_i$ and $\tau_j$ are allocated to $\varepsilon_k, \tau_i$ has the second-to-lowest priority, and $\tau_j$ has the lowest priority (all other tasks in $T_x$ are not allocated).

$$f_2(\tau_i, \tau_j, \varepsilon_k){:}f_2(\tau_i, \tau_j, \varepsilon_k) = \begin{cases} 0, & r_2^H(\tau_i, \tau_j, \varepsilon_k) > T_{\tau_i}; \\ 0, & r_2^L(\tau_i, \tau_j, \varepsilon_k) > T_{\tau_j}; \\ 1, & \text{otherwise.} \end{cases} \quad (11)$$

Although the tables are computed for signals in $T_S$ and tasks in $T_x$ in the above example, the operations and/or information can be reused for other scenarios, signals, and tasks.

In a further example, if the activation period of a task is updated from 200 msec to 100 msec, then the information of another task with the same activation period and a larger/equal execution time can be reused. In some cases, another task with a smaller/equal activation period and a larger/equal execution time can be reused. In some embodiments, the tables are computed and stored based on tasks and signals instead of paths/applications. This is because path/application-based tables need much more computation and space overheads. Alternatively, the tables may be computed and stored based on the paths/applications.

Figure 9:
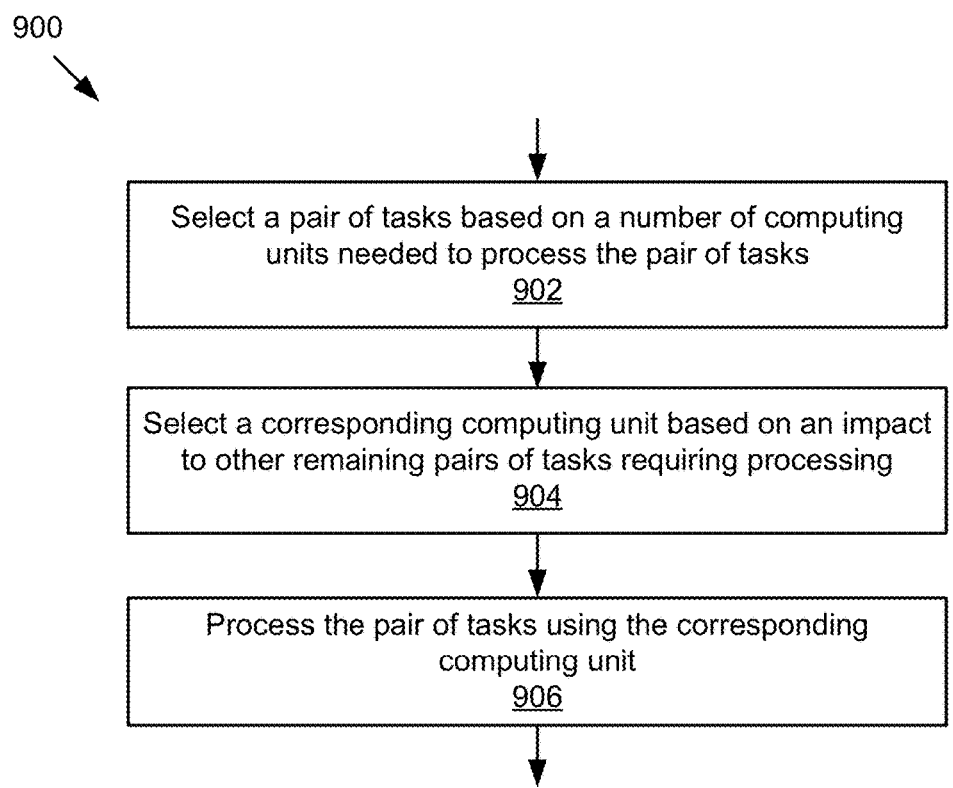
FIG. 9 is a flowchart of an example method for mapping tasks in a pairwise fashion.

FIG. 9 is a flowchart of an example method 900 for mapping tasks in a pairwise fashion. In an iteration, in block 902, the method 900 maps a pair of tasks based on a number of computing units needed to process the pair of tasks. In some embodiments, the pairs are consecutive tasks in a path. In block 904, the mapping engine 130 selects a corresponding computing unit based on an impact to other remaining pairs requiring processing. In block 906, the mapping engine processes the pair of tasks using the corresponding computing unit. Naturally, the method 900 may repeat as necessary to process remaining pairs of tasks.

A further non-limiting example pairwise mapping is reflected by algorithm 1200 shown in FIG. 12. In each iteration of the algorithm 1200, the mapping engine 130 selects a non-allocated pair with the smallest $M_j$, which indicates that the mapping engine 130 has the fewest choices of computing unit(s) 118 for the pair. Then, the mapping engine 130 selects a non-used feasible computing unit 118 with the smallest $N_k$, which indicates that the selection of that particular computing unit 118 will block the fewest other pairs of tasks (Line 3). Next, the mapping engine 130 allocates the tasks and assigns task priorities (Lines 4-12), after which it marks the pair and the computing unit 118 as allocated and used, respectively, and updates $M_j$ and $N_k$ for the remaining pairs and ECUs, respectively (Lines 13-16).

In some cases, the mapping engine 130 may decide the message priority assignment by a rate monotonic policy, in which case a message with a smaller activation period has a higher priority (Line 18). Lastly, the algorithm may check the feasibility and outputs the solution or a warning message (Lines 19-20).

The algorithm 1200 can provide relative efficiency gains to other approaches because the algorithm 1200 does not need to consider the feasibility of the tasks and signals which have been mapped, and does not require computations for to determine the variables of Equations (1) and (2). In Line 19, the worst-case latency of a path/application, Equation (3), can be computed directly by activation periods, allocation results, and the tables computed by the Post-Processing Algorithm.

In some instances, the number of iterations in the algorithm 1200 is in the order of the number of tasks in a path/application and the number of computing units. In these instances, while the timing complexity is $O(|T_\pi|^2+|T_\pi|\cdot|E|)$, in practice $|T_\pi|$ and $|E|$ are often less than 10 and 100, respectively. In a typical use-case, the number of computing unit(s) used to support plug-and-play is significantly less than 100, so the timing overhead of the algorithm 1200 can be relatively very low.

In some instances, the algorithm 1200 may solve a mapping problem with problem setting 2, which in some cases needs an even more efficient mapping algorithm than the other settings due to driving-time activation. The algorithm 1200 may utilize the tables computed by the algorithm 1500. When a path/application $\pi=(\tau_{i_1}, \sigma_{i_1}, \tau_{i_2}, \sigma_{i_2}, \ldots, \tau_{i_{n-1}}, \sigma_{i_{n-1}}, \tau_{i_n})$, where $n=|T_\pi|$, is going to be activated, the following may be computed. If n is even, for each pair of tasks $(\tau_{i_{j-1}}, \tau_{i_{2j}})$, $M_j$ is defined as the number of computing units 118 to which the pair can be allocated together, and it is initially computed as $$M_j = \sum_{k=1}^{|E|} \left( f_2(\tau_{i_{2j-1}}, \tau_{i_{2j}}, \varepsilon_k) \bigvee f_2(\tau_{i_{2j}}, \tau_{i_{2j-1}}, \varepsilon_k) \right). \quad (12)$$

For each computing unit $\varepsilon_k \in E$, $N_k$ is the number of possible allocated pairs, and it is initially computed as $$M_j = \sum_{k=1}^{|E|} \left( f_2(\tau_{i_{2j-1}}, \tau_{i_{2j}}, \varepsilon_k) \bigvee f_2(\tau_{i_{2j}}, \tau_{i_{2j-1}}, \varepsilon_k) \right). \quad (13)$$

If n is odd, it may regarded $\tau_{i_n}$ itself as a pair and use $f_1(\tau_{i_n}, \varepsilon_k)$ to compute $M_j$ and $N_k$.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   computing a path slack value for each path of a set of paths of a functional computing model, each path of the set of paths comprising a set of tasks, the path slack value of each path reflecting a difference between a deadline and a latency of the path;
   determining a priority of each task of the set of tasks of each path based on the difference between the deadline and the latency of the path; and
   allocating, based on the priority of each task, the tasks of each of the paths of the set to corresponding computing units from a set of computing units of an architectural platform.

2. The computer-implemented method of claim 1, further comprising:
   computing a response time for a first task from the tasks of a first path of the set of paths, the first task having a priority higher than priorities of other non-allocated tasks of the path, wherein, allocating, based on the priority of each task, the tasks of the paths to corresponding computing units includes, for each computing unit of the set of computing units of the architectural platform, determining a computing unit from the set of computing units to which to assign the first task based on the path slack value of one or more of the paths of the set, the path slack value being further computed based on the response time.

3. The computer-implemented method of claim 2, wherein determining the computing unit from the set of computing units is based on a largest summation of path slack values associated with the paths of the set.

4. The computer-implemented method of claim 2, further comprising:
   computing response times for the tasks of each path of the set of paths;
   storing the response times in one or more lookup tables; and
   during drive time, activating an application associated with the set of paths using the response times stored in the one or more lookup tables.

5. The computer-implemented method of claim 1, wherein the tasks of the paths are allocated in order of descending priorities.

6. The computer-implemented method of claim 1, wherein computing the path slack value for each path includes:
   determining a deadline value associated with the path;
   determining a latency associated with the tasks of the path; and
   computing a difference between the deadline value and the latency.

7. The computer-implemented method of claim 6, wherein determining the latency associated with the tasks of the path includes:
   calculating a worst-case response time associated with the tasks of the path;
   calculating an activation period associated with the tasks of the path;
   calculating a worst-case response time associated with signals of the path;
   calculating an activation period associated with the signals of the path; and
   calculating the latency based on the worst-case response time associated with the tasks of the path, the activation period associated with the tasks of the path, the worst-case response time associated with the signals of the path, and the activation period associated with the signals of the path.

8. The computer-implemented method of claim 6, wherein the deadline value is set to an activation period.

9. The computer-implemented method of claim 1, wherein the path slack value of a path from the set of paths is determined based on an activation period of a task included in the path.

10. The computer-implemented method of claim 9, further comprising:
    determining a response time of the task included in the path; and
    recomputing the path slack value for the path that includes the task based on the response time.

11. The computer-implemented method of claim 1, wherein allocating, based on the priority of each task, the tasks includes:
    selecting a pair of tasks based on a number of computing units needed to process the pair of tasks;

selecting a corresponding computing unit based on an impact to other remaining pairs of tasks requiring processing; and processing the pair of tasks using the corresponding computing unit.

12. A system comprising:

a set of computing units;

one or more memories storing instructions that, when executed by the system, cause the system to perform operations comprising:

computing a path slack value for each path of a set of paths of a functional computing model, each path of the set of paths comprising a set of tasks, the path slack value of each path reflecting a difference between a deadline and a latency of the path;

determining a priority of each task of the set of tasks of each path based on the path slack value of the path;

computing a response time for a first task from the tasks of a first path of the set of paths, the first task having a priority higher than priorities of other non-allocated tasks of the path; and allocating, based on the priority of each task, the tasks of each of the paths of the set to corresponding computing units from a set of computing units of an architectural platform, wherein, allocating, based on the priority of each task, the tasks of the paths to corresponding computing units includes, for each computing unit of the set of computing units of the architectural platform, determining a computing unit from the set of computing units to which to assign the first task based on the path slack value of one or more of the paths of the set, the path slack value being further computed based on the response time.

13. The system of claim 12, wherein determining the computing unit from the set of computing units is based on a largest summation of path slack values associated with the paths of the set.

14. The system of claim 12, wherein the instructions, when executed by the system, further cause the system to perform operations comprising:

computing response times for the tasks of each path of the set of paths;

storing the response times in one or more lookup tables; and during drive time, activating an application associated with the set of paths using the response times stored in the one or more lookup tables.

15. The system of claim 12, wherein the tasks of the paths are allocated in order of descending priorities.

16. The system of claim 12, wherein computing the path slack value for each path includes:

determining a deadline value associated with the path;

determining a latency associated with the tasks of the path; and computing a difference between the deadline value and the latency.

17. The system of claim 16, wherein determining the latency associated with the tasks of the path includes:

calculating a worst-case response time associated with the tasks of the path;

calculating an activation period associated with the tasks of the path;

calculating a worst-case response time associated with signals of the path;

calculating an activation period associated with the signals of the path; and calculating the latency based on the worst-case response time associated with the tasks of the path, the activation period associated with the tasks of the path, the worst-case response time associated with the signals of the path, and the activation period associated with the signals of the path.

18. The system of claim 16, wherein the deadline value is set to an activation period.

19. The system of claim 12, wherein the path slack value of a path from the set of paths is determined based on an activation period of a task included in the path.

20. The system of claim 19, wherein the instructions, when executed by the system, further cause the system to perform operations comprising:

determining a response time of the task included in the path; and recomputing the path slack value for the path that includes the task based on the response time.

21. The system of claim 12, wherein allocating, based on the priority of each task, the tasks includes:

selecting a pair of tasks based on a number of computing units needed to process the pair of tasks;

selecting a corresponding computing unit based on an impact to other remaining pairs of tasks requiring processing; and processing the pair of tasks using the corresponding computing unit.

22. A computer-implemented method comprising:

computing a path slack value for each path of a set of paths of a functional computing model, each path of the set of paths comprising a set of tasks, the path slack value of each path reflecting a difference between a deadline and a latency of the path;

determining the latency associated with the tasks of the path, including:

calculating a worst-case response time associated with the tasks of the path, calculating an activation period associated with the tasks of the path, calculating a worst-case response time associated with signals of the path, calculating an activation period associated with the signals of the path, and calculating the latency based on the worst-case response time associated with the tasks of the path, the activation period associated with the tasks of the path, the worst-case response time associated with the signals of the path, and the activation period associated with the signals of the path;

determining a priority of each task of the set of tasks of each path based on the path slack value of the path; and allocating, based on the priority of each task, the tasks of each of the paths of the set to corresponding computing units from a set of computing units of an architectural platform.

23. A computer-implemented method comprising:

computing a path slack value for each path of a set of paths of a functional computing model, each path of the set of paths comprising a set of tasks, the path slack value of each path reflecting a difference between a deadline and a latency of the path;

determining a priority of each task of the set of tasks of each path based on the path slack value of the path; and allocating, based on the priority of each task, the tasks of each of the paths of the set to corresponding computing units from a set of computing units of an architectural platform, allocating the tasks including:

selecting a pair of tasks based on a number of computing units needed to process the pair of tasks, selecting a corresponding computing unit based on an impact to other remaining pairs of tasks requiring processing, and processing the pair of tasks using the corresponding computing unit.

24. A computer-implemented method comprising:

computing a path slack value for each path of a set of paths of a functional computing model, each path of the set of paths comprising a set of tasks, the path slack value of each path reflecting a difference between a deadline and a latency of the path;

determining a priority of each task of the set of tasks of each path based on the path slack value of the path; and allocating, based on the priority of each task, the tasks of each of the paths of the set to corresponding computing units from a set of computing units of an architectural platform, including determining a computing unit from the set of computing units based on a largest summation of path slack values associated with the paths of the set.

25. A computer-implemented method comprising:

computing a path slack value for each path of a set of paths of a functional computing model, each path of the set of paths comprising a set of tasks, the path slack value of each path reflecting a difference between a deadline and a latency of the path;

determining a priority of each task of the set of tasks of each path based on the path slack value of the path;

allocating, based on the priority of each task, the tasks of each of the paths of the set to corresponding computing units from a set of computing units of an architectural platform;

computing response times for the tasks of each path of the set of paths;

storing the response times in one or more lookup tables; and during drive time, activating an application associated with the set of paths using the response times stored in the one or more lookup tables.

* * * * *